(12) United States Patent
Ting

(10) Patent No.: US 9,650,084 B2
(45) Date of Patent: May 16, 2017

(54) CONDUCTIVE POLYAMIDE COMPOSITION AND ARTICLE

(71) Applicant: SABIC Global Technologies B.V., Bergen op Zoom (NL)

(72) Inventor: Sai-Pei Ting, Slingerlands, NY (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 14/782,669

(22) PCT Filed: Jul. 3, 2013

(86) PCT No.: PCT/US2013/049230
§ 371 (c)(1),
(2) Date: Oct. 6, 2015

(87) PCT Pub. No.: WO2015/002650
PCT Pub. Date: Jan. 8, 2015

(65) Prior Publication Data
US 2016/0107705 A1   Apr. 21, 2016

(51) Int. Cl.
| | |
|---|---|
| *C08L 77/02* | (2006.01) |
| *C08L 77/06* | (2006.01) |
| *H01B 1/24* | (2006.01) |
| *B62D 29/04* | (2006.01) |
| *C08L 71/12* | (2006.01) |
| *C08L 53/02* | (2006.01) |
| *B60J 5/00* | (2006.01) |
| *B62D 25/02* | (2006.01) |

(52) U.S. Cl.
CPC ............... *B62D 29/04* (2013.01); *B60J 5/00* (2013.01); *B62D 25/025* (2013.01); *C08L 53/025* (2013.01); *C08L 71/12* (2013.01); *C08L 77/02* (2013.01); *H01B 1/24* (2013.01)

(58) Field of Classification Search
None
See application file for complete search history.

(56) References Cited

U.S. PATENT DOCUMENTS

| | | |
|---|---|---|
| 3,306,874 A | 2/1967 | Hay |
| 5,132,365 A | 7/1992 | Gallucci |
| 6,486,255 B2 | 11/2002 | Koevoets et al. |
| 6,593,411 B2 | 7/2003 | Koevoets et al. |
| 7,022,776 B2 | 4/2006 | Bastiaens et al. |
| 7,226,963 B2 | 6/2007 | Koevoets |
| 7,678,295 B2 | 3/2010 | Elkovitch et al. |
| 7,897,687 B2 | 3/2011 | Miyoshi |
| 8,025,158 B2 | 9/2011 | Delsman et al. |
| 2006/0020077 A1* | 1/2006 | Miyoshi ............... C08L 71/123 524/495 |
| 2006/0108567 A1* | 5/2006 | Charati ................ C08K 3/04 252/500 |
| 2011/0272640 A1 | 11/2011 | Bastiaens et al. |

FOREIGN PATENT DOCUMENTS

| | | |
|---|---|---|
| EP | 2192156 A1 | 2/2010 |
| JP | H04300956 A | 10/1992 |
| JP | H05092482 A | 4/1993 |
| JP | 2010031107 A | 2/2010 |
| WO | 9945069 A1 | 9/1999 |

OTHER PUBLICATIONS

International Search Report dated Apr. 17, 2014; International Application No. PCT/US2013/049230; International Filing Date Jul. 3, 2013 (6 pages).
Written Opinion dated Apr. 17, 2014; International Application No. PCT/US2013/049230; International Filing Date Jul. 3, 2013 (4 pages).

* cited by examiner

*Primary Examiner* — Jeffrey Mullis
(74) *Attorney, Agent, or Firm* — Cantor Colburn LLP

(57) ABSTRACT

An electrically conductive polyamide composition includes specific amounts of a polyamide-6, a poly(phenylene ether), talc, a hydrogenated block copolymer, carbon nanotubes, and a compatibilizing agent for the polyamide-6 and the poly(phenylene ether). The composition can contain little or no polyamide-6,6. The composition is useful for fabricating articles including automotive exterior side sill panels, and automotive exterior door panels.

3 Claims, 3 Drawing Sheets

| % PPE | 26.5 | 25.0 | 23.5 | 21.0 | 19.5 | 23.5 | 23.5 |
|---|---|---|---|---|---|---|---|
| % Talc | 16.2 | 16.2 | 16.2 | 16.2 | 16.2 | 17.6 | 18.9 |
| MVR - PA6 | 15.5 | 16.2 | 17.1 | 18.4 | 22.0 | 15.0 | 12.7 |
| MVR - PA66 | - | - | 12.2 | - | - | 10.5 | 8.7 |

CONDUCTIVE POLYAMIDE COMPOSITION AND ARTICLE

BACKGROUND OF THE INVENTION

Unfilled conductive blends of polyamide-6,6 and poly(phenylene ether) have long been used for exterior automotive parts such as fenders, mirror shells, and fuel filler doors due to their advantages including on-line painting capability, weight reduction (versus steel) for better fuel efficiency, dent resistance, and impact resistance. To date, the blends of polyamide-6,6 and poly(phenylene ether) have not been suitable for other exterior automotive components such as side sill panels and door panels because of difficulties formulating blends that simultaneously meet requirements for heat resistance, stiffness, electrical conductive, and coefficient of thermal expansion.

Coefficient of thermal expansion can be reduced by adding fillers such as glass fiber, talc, or mica. However, the addition of these materials tends to compromise impact strength. Electrical conductivity can be improved by adding electrically conductive carbon agents such as conductive carbon black (CCB), single-wall nanotubes (SWNT), or multi-wall nanotubes (MWNT), but their addition tends to increase cost, reduce impact strength, and reduce melt flow. European Patent Application Publication No. 2 192 156 A1 of Koevoets et al. describes compositions including specific amounts of polyphenylene ether, polyamide, filler, and multi-wall nanotubes ("carbon fibrils"). The compositions exemplified in the Koevoets application perform adequately for many uses, but for certain automotive uses, including side sill panels and door panels, there is a need for compositions that exhibit increased electrical conductivity, stiffness, and melt flow while substantially maintaining the heat resistance, and coefficient of thermal expansion.

BRIEF SUMMARY OF EMBODIMENTS OF THE INVENTION

One embodiment is a composition comprising the product of melt blending components comprising: 40 to 50 weight percent of a polyamide-6; 19 to 27 weight percent of a poly(phenylene ether) comprising a poly(2,6-dimethyl-1,4-phenylene ether); 15 to 20 weight percent of talc; 7 to 12 weight percent of a hydrogenated block copolymer comprising a polystyrene-poly(ethylene-propylene) diblock copolymer, a polystyrene-poly(ethylene-butylene)-polystyrene triblock copolymer, or a combination thereof; wherein the hydrogenated block copolymer has a polystyrene content of 28 to 37 weight percent; 1.1 to 1.7 weight percent of carbon nanotubes; and 0.2 to 1 weight percent of a compatibilizing agent for the polyamide-6 and the poly(phenylene ether); wherein all weight percent values are based on the total weight of the melt-blended components.

Another embodiment is an article comprising a composition comprising the product of melt blending components comprising: 40 to 50 weight percent of a polyamide-6; 19 to 27 weight percent of a poly(phenylene ether) comprising a poly(2,6-dimethyl-1,4-phenylene ether); 15 to 20 weight percent of talc; 7 to 12 weight percent of a hydrogenated block copolymer comprising a polystyrene-poly(ethylene-propylene) diblock copolymer, a polystyrene-poly(ethylene-butylene)-polystyrene triblock copolymer, or a combination thereof; wherein the hydrogenated block copolymer has a polystyrene content of 28 to 37 weight percent; 1.1 to 1.7 weight percent of carbon nanotubes; and 0.2 to 1 weight percent of a compatibilizing agent for the polyamide-6 and the poly(phenylene ether); wherein all weight percent values are based on the total weight of the melt-blended components.

These and other embodiments are described in detail below.

DETAILED DESCRIPTION OF THE INVENTION

Figure 1:
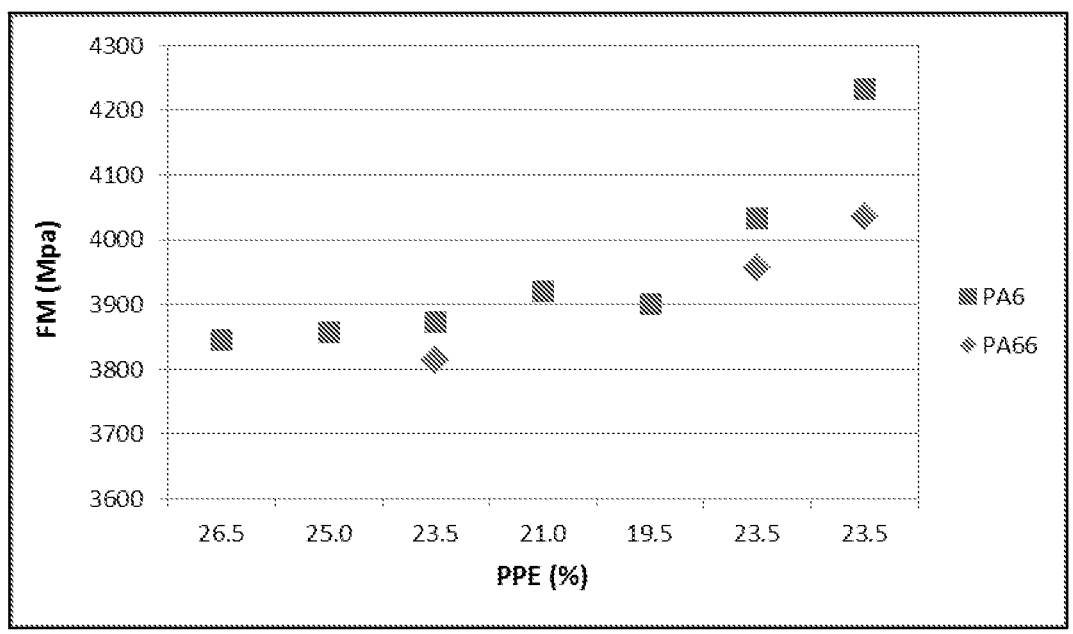
FIG. 1 is a plot of flexural modulus as a function of poly(phenylene ether) content, polyamide type, and talc content. At a given poly(phenylene ether) content and talc content, the composition with polyamide-6 has a higher flexural modulus than the composition with polyamide-6,6.

The present inventor has identified a plastic composition that provides increased electrical conductivity, stiffness, and melt flow while substantially maintaining the heat resistance, and coefficient of thermal expansion of the exemplified Koevoets compositions. The present composition is useful for molding automotive components including exterior side sill panels and exterior door panels.

One embodiment is a composition comprising the product of melt blending components comprising: 40 to 50 weight percent of a polyamide-6; 19 to 27 weight percent of a poly(phenylene ether) comprising a poly(2,6-dimethyl-1,4-phenylene ether); 15 to 20 weight percent of talc; 7 to 12 weight percent of a hydrogenated block copolymer comprising a polystyrene-poly(ethylene-propylene) diblock copolymer, a polystyrene-poly(ethylene-butylene)-polystyrene triblock copolymer, or a combination thereof; wherein the hydrogenated block copolymer has a polystyrene content of 28 to 37 weight percent; 1.1 to 1.7 weight percent of carbon nanotubes; and 0.2 to 1 weight percent of a compatibilizing agent for the polyamide-6 and the poly(phenylene ether); wherein all weight percent values are based on the total weight of the melt-blended components.

The composition can exhibit a heat deflection temperature of 180 to 190° C. determined according to ISO 75-2004, a flexural modulus of 3200 to 4300 megapascals determined at 23° C. according to ISO 178-2010, a specific volume resistivity of $1 \times 10^3$ to $5 \times 10^5$ ohm-centimeter, determined as described in the working examples below, and a coefficient of thermal expansion of 50 to 70 micrometers/meter-° C. In some embodiments, the composition further exhibits a notched Izod impact strength of 4 to 10 kilojoules/meter$^2$, specifically 5 to 8 kilojoules/meter$^2$, determined at 23° C. according to ISO 180-2006, and a melt volume flow rate of 12 to 25 centimeter$^3$/10 minutes, specifically 15 to 22 centimeter$^3$/10 minutes, determined according to ISO 1133-2011 Procedure B using a test temperature of 280° C., and an applied load of 5 kilograms.

The melt-blended components include polyamide-6. Polyamide-6, also known as nylon-6, polycaprolactam, and CAS Reg. No. 25038-54-4, is a widely commercially available polymer. The polyamide-6 has an amine end group content of 50 to 80 microequivalents per gram, as determined by titration with hydrochloric acid. Such an amine end group content facilitates compatibilization with the poly(phenylene ether). The polyamide-6 also has a relative viscosity of 30 to 50 measured in 90% formic acid. Such relatively low viscosity values increase the melt flow of the composition.

The melt-blended components comprise the polyamide-6 in an amount of 40 to 50 weight percent, based on the total weight of the melt-blended components (which is equivalent to the total weight of the composition). Within this range, the polyamide-6 amount can be 42 to 47 weight percent.

The composition can, optionally, comprise up to 8 weight percent polyamide-6,6 (i.e., 0 to 8 weight percent polyamide-6,6). Polyamide-6,6, also known as nylon-6,6, poly(hexamethylene adipamide), and CAS Reg. No. 32131-17-1, is structurally similar to polyamide-6, but, as shown in the working examples below, it fails to provide the desirable property balance of the present composition based on polyamide-6. In some embodiments, the polyamide-6,6 amount is 3 to 8 weight percent. In other embodiments, the polyamide-6,6 amount is 0 to 1 weight percent. In some embodiments, the composition excludes polyamide-6,6. In some embodiments, the composition comprises the sum of all polyamides other than polyamide-6 in an amount of 0 to 8 weight percent, specifically 0 to 6 weight percent, more specifically 0 to 4 weight percent, more specifically 0 to 1 weight percent. In some embodiments, the composition excludes all polyamides other than polyamide-6.

In addition to the polyamide-6, the melt-blended components comprise a poly(phenylene ether). Suitable poly(phenylene ether)s include those comprising repeating structural units having the formula

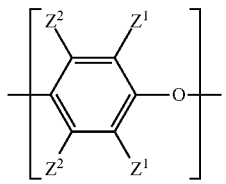

wherein each occurrence of $Z^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; and each occurrence of $Z^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of 0.33 to 0.46 deciliter per gram deciliter per gram measured by Ubbelohde viscometer at 25° C. in chloroform.

In some embodiments, the poly(phenylene ether) is essentially free of incorporated diphenoquinone residues. In the context, "essentially free" means that less than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues). For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1 to 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in U.S. Pat. No. 8,025,158 to Delsman et al. In an alternative approach utilizing the temperature-dependent solubility of diphenoquinone in toluene, a toluene solution containing diphenoquinone and poly(phenylene ether) can be adjusted to a temperature of 25° C., at which diphenoquinone is poorly soluble but the poly(phenylene ether) is soluble, and the insoluble diphenoquinone can be removed by solid-liquid separation (e.g., filtration).

The poly(phenylene ether) comprises a poly(2,6-dimethyl-1,4-phenylene ether). In some embodiments, the poly (2,6-dimethyl-1,4-phenylene ether) has an intrinsic viscosity of 0.33 to 0.46 deciliter per gram, measured in chloroform at 25° C.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present.

The melt-blended components comprise the poly(phenylene ether) in an amount of 19 to 27 weight percent, based on the total weight of the melt-blended components. Within this range, the poly(phenylene ether) amount can be 20 to 26 weight percent, specifically 21 to 25 weight percent.

In addition to the polyamide-6 and the poly(phenylene ether), the melt-blended components include talc. Talc is a hydrated magnesium silicate. In some embodiments, the talc has a median particle size of 2 to 5 micrometers. In some embodiments, the talc is not surface treated with an adhesion promoter.

The melt-blended components comprise the talc in an amount of 15 to 20 weight percent, based on the total weight of the melt-blended components. Within this range, the talc amount can be 15 to 18 weight percent. As demonstrated in the working examples below, for preparation of the composition, the talc can be provided in the form of a masterbatch in polyamide-6.

In addition to the polyamide-6, the poly(phenylene ether), and the talc, the melt-blended components include a hydrogenated block copolymer comprising a polystyrene-poly(ethylene-propylene) diblock copolymer, a polystyrene-poly(ethylene-butylene)-polystyrene triblock copolymer, or a combination thereof, wherein the hydrogenated block copolymer has a polystyrene content of 28 to 37 weight percent.

Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); and the polystyrene-poly(ethylene-butylene)-polystyrene triblock copolymers available from Kraton Performance Polymers Inc. as KRATON™ G1650 (having about 30 weight percent polystyrene), and G1651 (having about 33 weight percent polystyrene).

The melt-blended components comprise the hydrogenated block copolymer in an amount of 7 to 12 weight percent, based on the total weight of melt-blended components. Within this range, the hydrogenated block copolymer amount can be 7 to 11 weight percent, specifically 7 to 10 weight percent.

In addition to the polyamide-6, the poly(phenylene ether), the talc, and the hydrogenated block copolymer, the melt-blended components comprise carbon nanotubes. The carbon nanotubes can be single wall carbon nanotubes (SWNTs), multiwall carbon nanotubes (MWNTs), or a combination thereof. Carbon nanotubes can be produced by laser-evaporation of graphite, chemical vapor deposition, carbon arc synthesis, or the high-pressure carbon monoxide conversion process (HIPCO) process.

In some embodiments, the carbon nanotubes comprise MWNTs having multiple walls comprising graphene sheet with an outer diameter of 2 to 20 nanometers. MWNTs have at least two graphene layers bound around at least a portion of an inner hollow core. In some embodiments the MWNTs have only two graphene layers, while in other embodiments the MWNTs have only three graphene layers. MWNTs having only two graphene layers are termed double wall carbon nanotubes, while MWNTs having only three graphene layers are termed triple wall carbon nanotubes. Hemispherical caps generally close both ends of the MWNTs, but it may desirable to use MWNTs having only one hemispherical cap or MWNTs which are devoid of both hemispherical caps.

In some embodiments, the carbon nanotubes comprise SWNTs having a single graphene sheet with an outer diameter of 0.7 to 2.4 nanometers. It is generally desirable for the SWNTs to have an inherent thermal conductivity of at least 2000 Watts per meter-Kelvin (W/m-K) and an electrical conductivity of $10^4$ Siemens/centimeter (S/cm). It is also generally desirable for the SWNTs to have a tensile strength of at least 80 gigapascals (GPa) and a stiffness of at least 0.5 terapascals (TPa).

In some embodiments, the SWNTs comprise a mixture of metallic nanotubes and semi-conducting nanotubes. Metallic nanotubes are those that display electrical characteristics similar to metals, while the semi-conducting nanotubes are those that are electrically semi-conducting. In general, the manner in which the graphene sheet is rolled up produces nanotubes of various helical structures. Zigzag and armchair nanotubes constitute the two possible confirmations. In order to minimize the quantity of SWNTs utilized in the composition, it is generally desirable to have the metallic nanotubes constitute a large fraction of the total amount of SWNTs used in the composition. It is generally desirable for the SWNTs used in the composition to comprise metallic nanotubes in an amount of greater than or equal to 1 weight percent of the total weight of the SWNTs. In some embodiments, it is desirable to have metallic nanotubes in an amount of greater than or equal to 20 weight percent, while in another embodiment, it is desirable to have metallic nanotubes in an amount of greater than or equal to 30 weight percent of the total weight of the SWNTs. In yet other embodiments, it is desirable to have metallic nanotubes in an amount of greater than or equal to 50 weight percent of the total weight of the SWNTs.

Carbon nanotubes having aspect ratios of greater than or equal to 5 are generally utilized. In some embodiments, the aspect ratio is greater than or equal to 100, while in other embodiments, the aspect ratio is greater than or equal to 1,000. The carbon nanotubes generally comprise a central portion, which is hollow, but can be filled with amorphous carbon.

The melt-blended components comprise the carbon nanotubes in an amount of 1.1 to 1.7 weight percent, based on the total weight of the melt-blended components. Within this range, the carbon nanotube amount can be 1.1 to 1.5 weight percent, specifically 1.2 to 1.4 weight percent.

In addition to the polyamide-6, the poly(phenylene ether), the talc, the hydrogenated block copolymer, and the carbon nanotubes, the melt-blended components include a compatibilizing agent for the polyamide-6 and the poly(phenylene ether). As used herein, the term "compatibilizing agent" refers to a polyfunctional compound that interacts with the poly(phenylene ether), the polyamide-6, or both. This interaction can be chemical (for example, grafting) and/or physical (for example, affecting the surface characteristics of the dispersed phases). In either instance the resulting polyamide-6/poly(phenylene ether) blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of poly(phenylene ether) and polyamide-6 that are compatibilized without the use of a compatibilizing agent, as is the case, for example, when compatibilization is derived from compatibility-enhancing dibutylaminomethyl substituents on the poly(phenylene ether).

Examples of compatibilizing agents that can be employed include liquid diene polymers, epoxy compounds, oxidized polyolefin wax, quinones, organosilane compounds, polyfunctional compounds, functionalized poly(phenylene ether)s, and combinations thereof. Compatibilizing agents are further described in U.S. Pat. No. 5,132,365 to Gallucci, and U.S. Pat. Nos. 6,593,411 and 7,226,963 to Koevoets et al.

In some embodiments, the compatibilizing agent comprises a polyfunctional compound. Polyfunctional compounds that can be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, and the like; dichloro maleic anhydride; maleic acid amide; unsaturated dicarboxylic acids (for example, acrylic acid, butenoic acid, methacrylic acid, ethylacrylic acid, pentenoic acid, decenoic acids, undecenoic acids, dodecenoic acids, linoleic acid, and the like); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}H$, $C_nH_{2n-7}OH$ and $C_nH_{2n-9}OH$, wherein n is a positive integer from 10 to 30); unsaturated amines resulting from replacing from replacing the —OH group(s) of the above unsaturated alcohols with —NH$_2$ group(s); functionalized diene polymers and copolymers; and combinations comprising one or more of the foregoing. In some embodiments, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which can be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

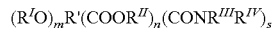

wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR$^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In some embodiments, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetyl succinic acid, trimellitic acid chloride, and chloroacetyl glutaric acid. In some embodiments, the compatibilizing agent comprises trimellitic anhydride acid chloride.

The foregoing compatibilizing agents can be added directly to the melt blend or pre-reacted with either or both of the poly(phenylene ether) and the polyamide, as well as with any other resinous materials employed in the preparation of the compatibilized polyamide-poly(phenylene ether) blend. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(phenylene ether). It is believed that such pre-reacting may cause the compatibilizing agent to react with and consequently functionalize the poly(phenylene ether). For example, the poly(phenylene ether) can be pre-reacted with maleic anhydride to form an anhydride-functionalized poly(phenylene ether) that has improved compatibility with the polyamide compared to a non-functionalized poly(phenylene ether).

In some embodiments, the compatibilizing agent comprises maleic acid, maleic anhydride, citric acid, fumaric acid, or a combination thereof.

The melt-blended components comprise the compatibilizing agent in an amount of 0.2 to 1 weight percent, based on the total weight of the melt-blended components. Within this range, the compatibilizing agent amount can be 0.2 to 0.8 weight percent, specifically 0.3 to 0.8 weight percent.

The melt-blended components can, optionally, further include mineral oil. When present, the amount of mineral oil is 0.5 to 1.5 weight percent, specifically 0.7 to 1.3 weight percent, based on the total weight of the melt-blended components.

The melt-blended components can, optionally, further comprise one or more additives known in the thermoplastics art. For example, the composition can, optionally, further comprise an additive chosen from stabilizers, mold release agents, lubricants, processing aids, drip retardants, nucleating agents, UV blockers, dyes, pigments, antioxidants, antistatic agents, blowing agents, metal deactivators, antiblocking agents, and combinations thereof. When present, such additives are typically used in a total amount of less than or equal to 5 weight percent, specifically less than or equal to 2 weight percent, more specifically less than or equal to 1 weight percent, based on the total weight of the melt-blended components.

The composition can, optionally, exclude components not described herein as required or optional. For example, the composition can exclude one or more of polyesters; polyolefins; homopolystyrenes; rubber-modified polystyrenes; unhydrogenated block copolymers of alkenyl aromatic compounds (such as styrene) and conjugated dienes (such as butadiene and isoprene); hydrogenated block copolymers having a polystyrene content less than 28 weight percent or greater than 37 weight percent; impact modifiers that comprise one or more moieties selected from carboxylic acid, anhydride, epoxy, oxazoline, and orthoester, and comprise less than 5 weight percent of alkenyl aromatic repeat units; electrically conductive agents other than carbon nanotubes; and fillers other than talc (such as glass fibers).

The composition is formed by melt-blending the specified components. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present composition can be prepared by melt-blending the components in a twin-screw extruder at a temperature of 250 to 320° C., specifically 260 to 310° C.

One embodiment is an article comprising the composition. Suitable methods of forming such articles include single layer and multilayer sheet extrusion, injection molding, blow molding, film extrusion, profile extrusion, pultrusion, compression molding, thermoforming, pressure forming, hydroforming, and vacuum forming Combinations of the foregoing article fabrication methods can be used. In some embodiments, forming the article comprises injection molding.

The composition is particularly suitable for forming automotive components, including automotive exterior side sill panels, and automotive exterior door panels.

All of the variations described above in the context of the composition apply as well to the article comprising the composition.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1

A composition comprising the product of melt blending components comprising: 40 to 50 weight percent of a polyamide-6; 19 to 27 weight percent of a poly(phenylene ether) comprising a poly(2,6-dimethyl-1,4-phenylene ether); 15 to 20 weight percent of talc; 7 to 12 weight percent of a hydrogenated block copolymer comprising a polystyrene-poly(ethylene-propylene) diblock copolymer, a polystyrene-poly(ethylene-butylene)-polystyrene triblock copolymer, or a combination thereof; wherein the hydrogenated block copolymer has a polystyrene content of 28 to 37 weight percent; 1.1 to 1.7 weight percent of carbon nanotubes; and 0.2 to 1 weight percent of a compatibilizing agent for the polyamide-6 and the poly(phenylene ether); wherein all weight percent values are based on the total weight of the melt-blended components.

Embodiment 2

The composition of embodiment 1, wherein the polyamide-6 has an amine end group content of 50 to 80 microequivalents/gram and a relative viscosity of 30 to 50 measured in 90% formic acid.

Embodiment 3

The composition of embodiment 1 or 2, wherein the melt-blended components comprise 0 to 8 weight percent of polyamide-6,6.

Embodiment 4

The composition of embodiment 3, wherein the melt-blended components comprise 3 to 8 weight percent of the polyamide-6,6.

Embodiment 5

The composition of embodiment 3, wherein the melt-blended components comprise 0 to 1 weight percent of the polyamide-6,6.

Embodiment 6

The composition of any of embodiments 1-5, wherein the poly(2,6-dimethyl-1,4-phenylene ether) has an intrinsic viscosity of 0.33 to 0.46 deciliter per gram, measured in chloroform at 25° C.

Embodiment 7

The composition of any of embodiments 1-6, wherein the talc has a median particle size of 2 to 5 micrometers.

Embodiment 8

The composition of any of embodiments 1-7, wherein the hydrogenated block copolymer comprises the polystyrene-poly(ethylene-butylene)-polystyrene triblock copolymer.

Embodiment 9

The composition of any of embodiments 1-8, wherein the carbon nanotubes comprise multiwall carbon nanotubes having a diameter of 2 to 20 nanometers.

Embodiment 10

The composition of any of embodiments 1-9, wherein the melt-blended components further comprise 0.5 to 1.5 weight percent of mineral oil.

Embodiment 11

The composition of embodiment 1, wherein the melt-blended components comprise 42 to 47 weight percent of the polyamide-6, 20 to 26 weight percent of the poly(phenylene ether), 15 to 18 weight percent of the talc, 7 to 11 weight percent of the hydrogenated block copolymer, 1.1 to 1.5 weight percent of the carbon nanotubes, and 0.2 to 0.8 weight percent of the compatibilizing agent; wherein the hydrogenated block copolymer comprises the polystyrene-poly(ethylene-butylene)-polystyrene triblock copolymer; and wherein the compatibilizing agent comprises maleic acid, maleic anhydride, citric acid, fumaric acid, or a combination thereof.

Embodiment 12

An article comprising a composition comprising the product of melt blending components comprising: 40 to 50 weight percent of a polyamide-6; 19 to 27 weight percent of a poly(phenylene ether) comprising a poly(2,6-dimethyl-1,4-phenylene ether); 15 to 20 weight percent of talc; 7 to 12 weight percent of a hydrogenated block copolymer comprising a polystyrene-poly(ethylene-propylene) diblock copolymer, a polystyrene-poly(ethylene-butylene)-polystyrene triblock copolymer, or a combination thereof; wherein the hydrogenated block copolymer has a polystyrene content of 28 to 37 weight percent; 1.1 to 1.7 weight percent of carbon nanotubes; and 0.2 to 1 weight percent of a compatibilizing agent for the polyamide-6 and the poly(phenylene ether); wherein all weight percent values are based on the total weight of the melt-blended components.

Embodiment 13

The article of embodiment 12, wherein the melt-blended components comprise 0 to 8 weight percent of polyamide-6,6.

Embodiment 14

The article of embodiment 13, wherein the melt-blended components comprise 3 to 8 weight percent of the polyamide-6,6.

Embodiment 15

The article of embodiment 13, wherein the melt-blended components comprise 0 to 1 weight percent of the polyamide-6,6.

Embodiment 16

The article of any of embodiments 12-16, wherein the hydrogenated block copolymer comprises the polystyrene-poly(ethylene-butylene)-polystyrene triblock copolymer.

Embodiment 17

The article of embodiment 12, wherein the melt-blended components comprise 42 to 47 weight percent of the polyamide-6, 20 to 26 weight percent of the poly(phenylene ether), 15 to 18 weight percent of the talc, 7 to 11 weight percent of the hydrogenated block copolymer, 1.1 to 1.5 weight percent of the carbon nanotubes, and 0.2 to 0.8 weight percent of the compatibilizing agent; wherein the hydrogenated block copolymer comprises the polystyrene-poly(ethylene-butylene)-polystyrene triblock copolymer; and wherein the compatibilizing agent comprises maleic acid, maleic anhydride, citric acid, fumaric acid, or a combination thereof.

Embodiment 18

The article of any of embodiments 12-17, wherein the article is an automotive exterior side sill panel.

Embodiment 19

The article of any of embodiments 12-17, wherein the article is an automotive exterior door panel.

The invention is further illustrated by the following non-limiting examples.

Examples 1-7

Comparative Examples 1-3

These examples illustrate the property effect of talc in a conductive composition based on polyamide-6. Components used to prepare the compositions are summarized in Table 1.

TABLE 1

| Component | Description |
|---|---|
| PPE | Poly(2,6-dimethyl-1,4-phenylene ether), CAS Reg. No. 24938-67-8, having an intrinsic viscosity of about 0.40 deciliter per gram as measured in chloroform at 25° C.; available as PPO ™ 640 from SABIC Innovative Plastics. |
| CA | Citric acid, CAS Reg. No. 77-92-9; available from International Chemicals. |
| Min. oil | Mineral oil, available as KAYDOL ™ White Mineral Oil from Sonneborn. |
| SEBS | Polystyrene-poly(ethylene-butylene)-polystyrene triblock copolymer, CAS Reg. No. 66070-58-4, having a polystyrene content of about 33 weight percent; available as KRATON ™ G1651 from Kraton Performance Polymers Inc. |
| HF-PA66 | High-flow polyamide-6,6, CAS Reg. No. 32131-17-2, having an amine end group content of 49-53 microequivalents per gram, a relative viscosity of 34.4-47.7 measured in 90% formic acid, and a melting point of about 265° C.; available as VYDYNE ™ 21ZLV from Ascend Ltd. |
| CNT-PA66 | A masterbatch of 20 weight percent multiwall carbon nanotubes and 80 weight percent polyamide-6,6; available as MB4620-00 from Hyperion. |
| HF-PA6 | High-flow polyamide-6, CAS Reg. No. 25038-54-4, having an amine end group content of 58-66 microequivalents/gram and a relative viscosity of 34-42 measured in 90% formic acid; available as RD963 from Custom Resins. |
| Talc-PA6 | A masterbatch of 45 weight percent talc and 55 weight percent HF-PA6; available as 26300-A1-000 from Americhem; the talc is untreated and has a median particle size of 3.2 micrometers. |

All examples of compositions of the present invention (Examples 1-7) and examples of comparative compositions (Comparative Examples 1-7) are summarized in Table 2 as pertains to their respective weight percentage each contains of PPE, Talc-PA6, CNT-PA66, HF-PA6 and HF-PA66. In addition to the components listed in Table 2, all compositions also contained 0.5 weight percent CA, 1.0 weight percent Min. oil and 8.0 weight percent SEBS. All materials were compounded by a Werner-Pfleiderer 28 millimeter twin-screw long extruder with three kneading sections. PPE was used as a carrier for citric acid, SEBS, and mineral oil. These components were first was dry blended in a Henschel™ mixer then fed upstream to the extruder. HF-PA6 or HF-PA66, Talc-PA6, and CNT-PA66 were fed downstream to the extruder. Detailed compounding conditions are as follows. The extruder was operated at 300 rotations per minute, a throughput of 11.3 kilograms per hour (25 pounds per hour), and zone temperatures of 310° C. (590° F.) in zones 1-4, 299° C. (570° F.) in zone 5, 266° C. (510° F.) in zones 6-13, and 299° C. (570° F.) at the die. Test articles for physical property testing were injection molded on a Van Dorn 85T injection molding machine with a barrel temperature of 302° C. (575° F.) and a mold temperature of 88° C. (190° F.).

Properties are summarized in Table 2. Heat deflection temperature values, expressed in degrees centigrade, were determined according to ISO 75-2004, using a bar having dimensions of 80×10×4 millimeters, a flatwise test direction, a support span of 64 millimeters, a load of 0.45 megapascals, a heating rate of 120° C. per hour, a deflection of 0.34 millimeters at reading, and three specimens per composition. Notched Izod impact strength values, expressed in units of kilojoules/meter$^2$, were determined at 23° C. according to ISO 180-2006 using a bar having cross-sectional dimensions of 10×4 millimeters, a radius Type A notch, a notch angle of 45°, a depth of material under notch of 8 millimeters, a pendulum energy of 5.5 joules for Comparative Examples 1-3 and 1.0 joule for Examples 1-7, and ten specimens per composition. Dynatup energy at maximum load values, expressed in units of joules, were determined at 23° C. according to ASTM D 3763-10 at 23° C. using a test velocity of 3.3 meters/second, a specimen thickness of 3.2 millimeters, a clamp hole diameter of 76 millimeters, a dart diameter of 12.7 millimeters, and 5 specimens per composition. Tensile modulus values, expressed in units of megapascals, tensile stress at break values, expressed in units of megapascals, and tensile strain at break values, expressed in units of percent, were measured at 23° C. according to ISO 527-1 and -2 using a bar having dimensions 80×10×4 millimeters, a gage length of 50 millimeters, a grip separation of 115 millimeters, a test speed of 1 millimeter per minute for modulus and 5 millimeters per minute for stress at break and strain at break, and five specimens per composition. Flexural modulus and strength values, each expressed in units of megapascals, were determined at 23° C. according to ISO 178-2010 using a bar having dimensions 80×10×4 millimeters, a support span of 64 millimeters, a test speed of 2 millimeters per minute, loading nose and support radii of 5 millimeters, and five specimens per composition. Specific gravity values, which are unitless, were determined according to ASTM D792-08, Method A, and one specimen per composition.

Specific volume resistivity (SVR) values, expressed in units of ohm-centimeters, were determined at 23° C. as follows. A tensile bar was molded according to ISO 3167-2002. A sharp, shallow cut was made near each end of the narrow central portion of the bar. The bar was fractured in a brittle fashion at each cut to separate the narrow central portion having fractured ends with cross-sectional dimensions of 10 millimeters by 4 millimeters. In order to obtain fracturing in a brittle fashion, the tensile bar was cooled, for example, in dry ice, in a freezer at −40° C., or in liquid nitrogen. The length of the bar between the fractured ends was measured. The fractured ends of the sample were painted with conductive silver paint, and the paint was allowed to dry. Using a multi-meter, electrodes were attached to each of the painted surfaces, and the resistance was measured at an applied voltage of 500 millivolts to 1000 millivolts. Values of specific volume resistivity were obtained by multiplying the measured resistance by the fracture area of one side of the bar and dividing by the length of the bar $$r = R \times A / L$$

where r is the specific volume resistivity in ohm-centimeters, R is the measured resistance in ohms, A is the fractured area in square centimeters, and L is the sample length in centimeters. The procedure was repeated for a total of five samples, and the results for the five samples were averaged to provide the reported specific volume resistivity value.

Melt volume flow rate values, expressed in units of centimeter$^3$ per ten minutes, were determined according to ISO 1133-2011 Procedure B using a test temperature of 280° C., an applied load of 5 kilograms, a capillary diameter of 2.0955 millimeters, a capillary length of 8 millimeters, a test specimen form of pellets, conditioning of 16 hours at 110° C., a pre-heat (dwell) time of 5 minutes, and one run with five readings per composition. Coefficient of thermal expansion values, expressed in units of micrometer/(meter-° C.), were determined by thermomechanical analysis (TMA) using a heating rate of 10° C. per minute from 0 to 60° C., and one sample per composition.

Figure 2:
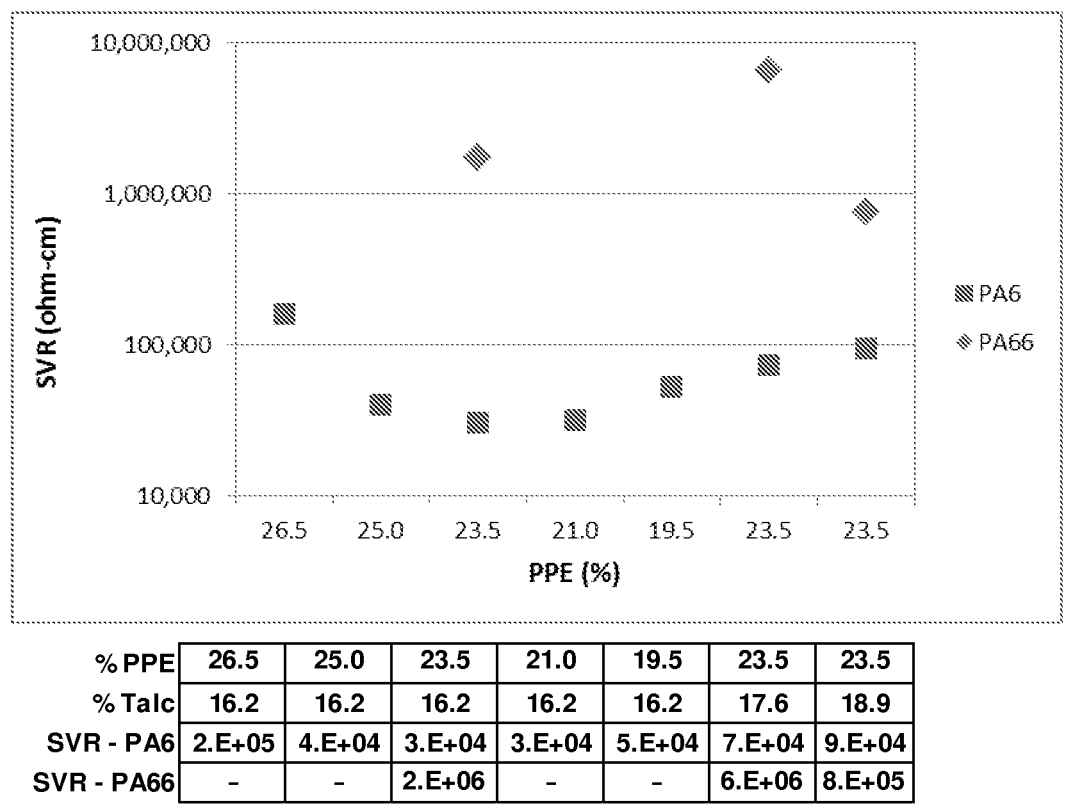
FIG. 2 is a plot of specific volume resistivity as a function of poly(phenylene ether) content, polyamide type, and talc content. At a given poly(phenylene ether) content and talc content, the composition with polyamide-6 has a lower volume resistivity (higher conductivity) than the composition with polyamide-6,6.
Figure 3:
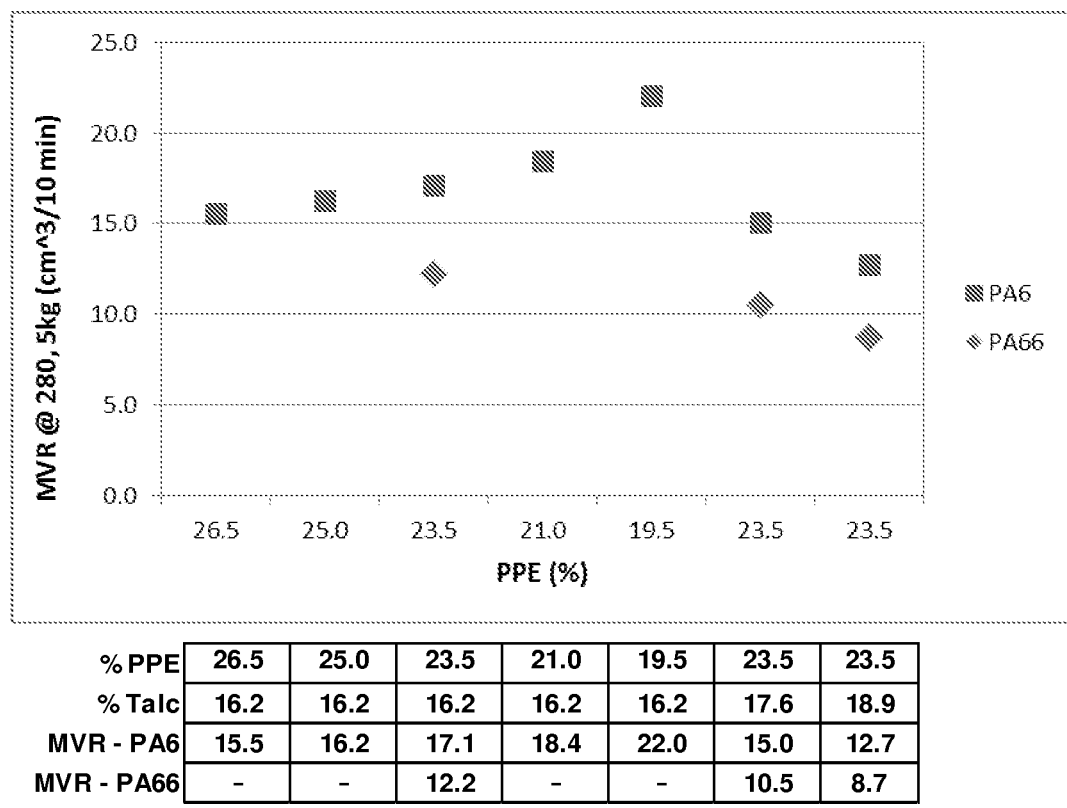
FIG. 3 is a plot of melt volume flow rate as a function of poly(phenylene ether) content, polyamide type, and talc content. At a given poly(phenylene ether) content and talc content, the composition with polyamide-6 has a higher melt flow than the composition with polyamide-6,6.

The results in Table 2 show that inventive Examples 1-7 exhibit increased flexural modulus, decreased resistivity (increased conductivity), and increased melt flow relative to Comparative Examples 1-3. These effects are further illustrated in FIG. 1, showing the flexural modulus advantage associated with polyamide-6 relative to polyamide-6,6, FIG. 2, showing the resistivity advantage, and FIG. 3, showing the melt flow advantage.

TABLE 2

|  | C. Ex. 1 | C. Ex. 2 | C. Ex. 3 | Ex. 1 | Ex. 2 |
|---|---|---|---|---|---|
| COMPOSITIONS | | | | | |
| PPE | 26.5 | 23.5 | 19.5 | 26.5 | 25.0 |
| Talc-PA6 | 0.0 | 0.0 | 0.0 | 36.0 | 36.0 |
| HF-PA6 | 57.9 | 60.5 | 64.0 | 21.9 | 23.2 |
| CNT-PA66 | 6.1 | 6.5 | 7.0 | 6.1 | 6.3 |
| total PA | 62.8 | 65.7 | 69.6 | 46.6 | 48.0 |
| total PA6 | 57.9 | 60.5 | 64.0 | 41.7 | 43.0 |
| total PA66 | 4.9 | 5.2 | 5.6 | 4.9 | 5.0 |
| talc | 0.00 | 0.00 | 0.00 | 16.20 | 16.20 |
| CNT | 1.22 | 1.30 | 1.40 | 1.22 | 1.26 |
| CNT/PA ratio | 0.019 | 0.020 | 0.020 | 0.026 | 0.026 |
| PROPERTIES | | | | | |
| HDT (° C.) | 171 | 175 | 167 | 187 | 184 |
| Notched Izod (kJ/m$^2$) | 24.9 | 24.3 | 27.5 | 7.2 | 7.3 |
| Dynatup energy at max. load (J) | 49.1 | 47.3 | 36.8 | 24.6 | 27.8 |
| Tens. modulus (MPa) | 2554 | 2605 | 2588 | 4235 | 4216 |
| Tens. stress at break (MPa) | 52 | 55 | 54 | 59 | 59 |
| Tens. strain at break (%) | 56 | 68 | 64 | 6 | 8 |
| Flexural modulus (MPa) | 2289 | 2272 | 2254 | 3845 | 3856 |

TABLE 2-continued

|  | | | | | |
|---|---|---|---|---|---|
| Flexural strength (MPa) | 96 | 75 | 96 | 106 | 106 |
| Specific Gravity | 1.10 | 1.11 | 1.11 | 1.22 | 1.22 |
| SVR (ohm-cm) | OL* | OL* | OL* | $2 \times 10^5$ | $4 \times 10^4$ |
| MVR (cm$^3$/10 min) | 45.4 | 55.6 | 67.2 | 15.5 | 16.2 |
| CTE (μm/m-° C.) | — | 86.4 | — | 56.9 | — |

|  | Ex. 3 | Ex. 4 | Ex. 5 | Ex. 6 | Ex. 7 |
|---|---|---|---|---|---|
| | COMPOSITIONS | | | | |
| PPE | 23.5 | 21.0 | 19.5 | 23.5 | 23.5 |
| Talc-PA6 | 36.0 | 36.0 | 36.0 | 39.0 | 42.0 |
| HF-PA6 | 24.5 | 26.7 | 28.0 | 21.7 | 18.9 |
| CNT-PA66 | 6.5 | 6.8 | 7.0 | 6.3 | 6.1 |
| total PA | 49.5 | 51.9 | 53.4 | 48.2 | 46.9 |
| total PA6 | 44.3 | 46.5 | 47.8 | 43.2 | 42.0 |
| total PA66 | 5.2 | 5.4 | 5.6 | 5.0 | 4.9 |
| talc | 16.2 | 16.2 | 16.2 | 17.6 | 18.9 |
| CNT | 1.30 | 1.36 | 1.40 | 1.26 | 1.22 |
| CNT/PA ratio | 0.026 | 0.026 | 0.026 | 0.026 | 0.026 |
| | PROPERTIES | | | | |
| HDT (° C.) | 186 | 184 | 185 | 183 | 188 |
| Notched Izod (kJ/m$^2$) | 6.8 | 7.1 | 7.0 | 6.5 | 6.3 |
| Dynatup energy at max. load (J) | 22.3 | 22.3 | 20.4 | 18.1 | 16.4 |
| Tens. modulus (MPa) | 4328 | 4352 | 4348 | 4451 | 4624 |
| Tens. stress at break (MPa) | 60 | 62 | 60 | 59 | 60 |
| Tens. strain at break (%) | 5 | 5 | 5 | 8 | 6 |
| Flexural modulus (MPa) | 3873 | 3920 | 3900 | 4034 | 4233 |
| Flexural strength (MPa) | 107 | 108 | 107 | 108 | 109 |
| Specific Gravity | 1.22 | 1.23 | 1.23 | 1.23 | 1.25 |
| SVR (ohm-cm) | $3 \times 10^4$ | $3 \times 10^4$ | $5 \times 10^4$ | $7 \times 10^4$ | $9 \times 10^4$ |
| MVR (cm$^3$/10 min) | 17.1 | 18.4 | 22.0 | 15.0 | 12.7 |
| CTE (μm/m-° C.) | 56.3 | — | 61.9 | — | 53.3 |

*OL = over the limit of the multimeter, which means that the resistance was greater than $1 \times 10^{10}$ ohm-centimeters.

Comparative Examples 4-7

These examples illustrate the property effects of talc in conductive compositions containing substantial amounts of polyamide-6,6. In addition to the components listed in Table 2, all compositions also contained 0.5 weight percent CA, 1.0 weight percent Min. oil and 8.0 weight percent SEBS. Note that Comparative Example 4 corresponds to Comparative Example 2 with all polyamide-6 having been replaced by polyamide-6,6; Comparative Example 5 corresponds to Example 3 with polyamide-6,6 replacing all the polyamide-6 except that associated with the talc masterbatch; Comparative Examples 6 and 7 similarly correspond to Examples 6 and 7, respectively, with polyamide-6,6 replacing all the polyamide-6 except that associated with the talc masterbatch. Comparative Examples 4-7 all exhibit substantially higher resistivities (lower conductivities) than corresponding Comparative Example 2 and Examples 3, 6, and 7, respectively. Comparative Example 4 also exhibits a low flexural modulus value.

TABLE 3

|  | C. Ex. 4 | C. Ex. 5 | C. Ex. 6 | C. Ex. 7 |
|---|---|---|---|---|
| | COMPOSITIONS | | | |
| PPE | 23.5 | 23.5 | 23.5 | 23.5 |
| Talc-PA6 | 0.0 | 36.0 | 39.0 | 42.0 |
| HF-PA66 | 60.5 | 24.5 | 21.7 | 18.9 |
| CNT-PA66 | 6.5 | 6.5 | 6.3 | 6.1 |
| total PA | 65.7 | 49.5 | 48.2 | 46.9 |
| total PA6 | 0.0 | 19.8 | 21.5 | 23.1 |
| total PA66 | 65.7 | 29.7 | 26.7 | 23.8 |
| Talc | 0.0 | 16.2 | 17.6 | 18.9 |
| CNT | 1.3 | 1.3 | 1.3 | 1.2 |
| CNT/PA ratio | 0.020 | 0.026 | 0.026 | 0.026 |
| | PROPERTIES | | | |
| HDT (° C.) | 188 | 185 | 191 | 186 |
| Notched Izod (kJ/m$^2$) | 22.9 | 6.9 | 6.5 | 6.0 |
| Dynatup energy at max. load (J) | 35.4 | 15.7 | 16.2 | 16.2 |
| Tens. modulus (MPa) | 2626 | 4195 | 4374 | 4511 |
| Tens. stress at break (MPa) | 63 | 57 | 58 | 57 |
| Tens. strain at break (%) | 44 | 15 | 13 | 13 |
| Flexural modulus (MPa) | 2301 | 3814 | 3955 | 4035 |
| Flexural strength (MPa) | 100 | 105 | 105 | 104 |
| Specific Gravity | 1.10 | 1.22 | 1.23 | 1.24 |
| SVR (ohm-cm) | OL* | $2 \times 10^6$ | $6 \times 10^6$ | $8 \times 10^5$ |
| MVR (cm$^3$/10 min) | 41.6 | 12.2 | 10.5 | 8.7 |
| CTE (μm/m-° C.) | 93 | 60.0 | — | 60.0 |

*OL = over the limit of the multimeter, which means that the resistance was greater than $1 \times 10^{10}$ ohm-centimeters.

The invention claimed is:

1. A composition comprising the product of melt blending components comprising:
   40 to 50 weight percent of a polyamide-6;
   3 to 8 weight percent of a polyamide-6,6;
   19 to 27 weight percent of a poly(phenylene ether) comprising a poly(2,6-dimethyl-1,4-phenylene ether);
   15 to 20 weight percent of talc;
   7 to 12 weight percent of a hydrogenated block copolymer comprising a polystyrene-poly(ethylene-propylene) diblock copolymer, a polystyrene-poly(ethylene-butylene)-polystyrene triblock copolymer, or a combination thereof; wherein the hydrogenated block copolymer has a polystyrene content of 28 to 37 weight percent;
   1.1 to 1.7 weight percent of carbon nanotubes; and
   0.2 to 1 weight percent of a compatibilizing agent for the polyamide-6 and the poly(phenylene ether);
   wherein all weight percent values are based on the total weight of the melt-blended components.

2. An article comprising a composition comprising the product of melt blending components comprising:
   40 to 50 weight percent of a polyamide-6;
   3 to 8 weight percent of a polyamide-6,6;
   19 to 27 weight percent of a poly(phenylene ether) comprising a poly(2,6-dimethyl-1,4-phenylene ether);
   15 to 20 weight percent of talc;
   7 to 12 weight percent of a hydrogenated block copolymer comprising a polystyrene-poly(ethylene-propylene) diblock copolymer, a polystyrene-poly(ethylene-butylene)-polystyrene triblock copolymer, or a combination thereof; wherein the hydrogenated block copolymer has a polystyrene content of 28 to 37 weight percent;
   1.1 to 1.7 weight percent of carbon nanotubes; and
   0.2 to 1 weight percent of a compatibilizing agent for the polyamide-6 and the poly(phenylene ether);
   wherein all weight percent values are based on the total weight of the melt-blended components.

3. An article comprising a composition comprising the product of melt blending components comprising:
   40 to 50 weight percent of a polyamide-6;
   19 to 27 weight percent of a poly(phenylene ether) comprising a poly(2,6-dimethyl-1,4-phenylene ether);
   15 to 20 weight percent of talc;
   7 to 12 weight percent of a hydrogenated block copolymer comprising a polystyrene-poly(ethylene-propylene)

diblock copolymer, a polystyrene-poly(ethylene-butylene)-polystyrene triblock copolymer, or a combination thereof; wherein the hydrogenated block copolymer has a polystyrene content of 28 to 37 weight percent;

1.1 to 1.7 weight percent of carbon nanotubes; and 0.2 to 1 weight percent of a compatibilizing agent for the polyamide-6 and the poly(phenylene ether);

wherein all weight percent values are based on the total weight of the melt-blended components; and wherein the article is an automotive exterior side sill panel.

* * * * *